US006901965B2

(12) United States Patent
Baltes et al.

(10) Patent No.: US 6,901,965 B2
(45) Date of Patent: Jun. 7, 2005

(54) HYDROPNEUMATIC ACCUMULATOR

(75) Inventors: Herbert Baltes, Losheim (DE); Markus Lehnert, Dillingen (DE)

(73) Assignee: HYDAC Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/468,267

(22) PCT Filed: Mar. 13, 2002

(86) PCT No.: PCT/EP02/02750

§ 371 (c)(1),
(2), (4) Date: Aug. 19, 2003

(87) PCT Pub. No.: WO02/075161

PCT Pub. Date: Sep. 26, 2002

(65) Prior Publication Data

US 2004/0065374 A1 Apr. 8, 2004

(30) Foreign Application Priority Data

Mar. 17, 2001 (DE) ........................................ 101 12 976

(51) Int. Cl.[7] ................................................ F16L 55/04

(52) U.S. Cl. ........................... 138/30; 138/26; 220/721; 303/87

(58) Field of Search ............................ 138/30, 26, 31; 220/721

(56) References Cited

U.S. PATENT DOCUMENTS 2,360,590 A 10/1944 Schweller .................... 138/30
5,036,110 A * 7/1991 Moureaux ................... 521/137
5,133,387 A * 7/1992 Pietrykowski et al. ......... 138/30
5,367,605 A * 11/1994 Violi .......................... 392/401

FOREIGN PATENT DOCUMENTS

| | | |
|---|---|---|
| DE | 1675349 | 1/1971 |
| DE | 2852912 | 6/1980 |
| DE | 4018318 | 12/1991 |
| DE | 4131790 | 5/1992 |
| DE | 4405009 | 8/1995 |
| EP | 0927631 | 7/1999 |

* cited by examiner

*Primary Examiner*—Patrick Brinson
(74) *Attorney, Agent, or Firm*—Roylance, Abrams, Berdo & Goodman L.L.P.

(57) ABSTRACT

A hydraulic accumulator includes an accumulator housing (1) and a diaphragm (3) forming a displaceable partition element in the housing between a gas chamber (7) and a liquid chamber (5). The membrane has several annular regions (31, 33, 35, 37, 39), interconnected by annular weak points (61, 63, 65, 67, 69, 71). The annular regions (31, 33, 35, 37, 39), have protuberances (81, 83, 85, 87, 89) on the interior face of the membrane (3) facing away from the wall of the accumulator housing (1). The protuberances are at their thickest in the central region between adjacent weak points, thus increasing the wall thickness of the membrane (3), and are at least partially convex (91,93), tapering off to a respective flat form towards the weak points.

12 Claims, 4 Drawing Sheets

HYDROPNEUMATIC ACCUMULATOR

FIELD OF THE INVENTION

The present invention relates to a hydropneumatic accumulator with an accumulator housing and a membrane. The membrane is located in the housing and forms a movable separating element between a first chamber, especially a gas chamber, and a second chamber, especially a liquid chamber. Several annular areas of the membrane are interconnected by annular weak points acting as articulations. The annular areas have elevations on the inner side of the membrane facing away from the wall of the accumulator housing.

BACKGROUND OF THE INVENTION

Hydropneumatic accumulators are known in a host of constructions and embodiments. One of the main tasks of hydropneumatic accumulators (accumulators) is to accommodate certain volumes of pressurized liquid of a hydraulic system and to return it if necessary to the system.

DE-A-41 31 790 discloses a bladder or membrane for an accumulator comprising an elastic material layer. The elastic material layer is laminated with a gas blocking layer. An elastic fastener is formed on the inside surface of a peripheral edge piece of the elastic material layer so that it or the material layer can be pressed onto the housing, if the fastener is attached to the housing by a holding element. The membrane is made W-shaped in cross section. The thickness of the elastic material layer decreases in an interposed section and/or increases on the curved reverse area of the material layer. The convex middle area of the W-shaped membrane is therefore reversed to the edge of the membrane. In the direction of the fastener into a concavely extending curvature and in spite of the thickness increase of the membrane intended in this area for a plurality of load cycles, its edge tearing and consequently failure of the accumulator cannot be precluded.

Conversely, in an accumulator disclosed in DE-A-40 18 318, the membrane is divided into zones which are articulated to one another to help prevent uncontrolled unfolding of the membrane during its working movements and to achieve longer service lives. In this known approach, conversely, between the deflection points of the membrane in the form of film hinges, the membrane is embossed in plate or strip form. This embossing can be unfavorable in the process of unwinding of the membrane, especially when the plate-shaped elevations abut one another. Thus, increased force application in the area of the film articulations occurs.

DE-A-1 675 349 discloses a hydropneumatic accumulator with an accumulator housing and a membrane located therein. The membrane forms a movable separating element between a first chamber, especially a gas chamber, and a second chamber, especially a liquid chamber, and has several annular areas interconnected by annular weak points which act like articulations. The annular areas have elevations on the inner side of the membrane facing away from the wall of the accumulator housing. In the central area between adjacent weak points, the elevations have the greatest height which increases the wall thickness of the membrane, and have a shape tapering off towards these weak points. Each elevation is convex at least in partial areas. In the known approach, the elevations form annular beads or ribs which project out of the plane of the separating element in the direction of the inner side of the membrane. Their convex arches taper off steeply in both directions and pass in this way into elongated annular wall areas of the separating membrane when viewed in the lengthwise direction of the hydraulic accumulator. The elongated annular wall areas keep the elevations in the initial position of the separating element at equal distances to one another. Due to the sharply delineated transitions between the bead-shaped or annular elevations and the weak points which are formed from parts of the separating element with the same wall thickness, kinks in the membrane are formed. The result is that when it moves overstresses can form locally and accordingly it can fail.

SUMMARY OF THE INVENTION

Objects of the present invention are to provide an accumulator characterized by especially good operating behavior of the membrane so that a long service life can be achieved, even during operation with high pressure ratios and high rates of pressure change.

In an accumulator of this type, these objects are achieved in the present invention by the elevations, at least in the area bordering the adjacent weak points, taper off to the tangential plane of the pertinent weak points. This tangential plane is tangential relative to the stretched shape of the membrane, to the weak points, at a flat angle which is less than 20°.

The shape of the present invention has the areas of the membrane which taper off flatly towards the articulations, and avoids the danger that when the membrane folds of overly sharp kinks at the joints form, as in the aforementioned, known generic accumulators. Thus the damaging notch effect is prevented. Conversely, the articulated movements for the shape of the present invention take place with a certain radius of curvature, by which the danger of local overstress of the membrane is prevented. Without overly enlarging the wall thickness of the membrane, thus, comparatively large pressure amplitudes and rates of pressure change are allowable.

DE-A-28 52 912 discloses an accumulator with a thick-walled separating element of rubber. The inner annular areas on the separating element are formed with bead-like elevations. The elevations are beads or ribs which project out of the plane of the separating element, without the beads or ribs having to be separated from one another by weak points which act in the manner of a film hinge. Moreover, the beads in the areas adjacent to one another have a steeply tapering shape so that a careful unwinding process cannot be achieved with this known membrane.

In one preferred embodiment of the accumulator of the present invention, the weak points have a concave shape. The membrane has an alternating sequence of convex with concave areas. This arrangement yields especially good bending and unrolling properties in the folding of the membrane. Preferably, the membrane, in its initial position along its outer surface, has a permanent and essentially uniform curvature, and the membrane is designed in the manner of a hemisphere in its initial position.

Preferably, the angle between the area of the elevations adjoining the bordering weak points and the tangential plane which belongs to the pertinent weak points, relative to the stretched shape of the membrane, is less than or equal to 15°.

Especially good bending properties arise when the membrane forms folds if the elevations in the area bordering the weak points have a concave arch and in the area adjacent to the greatest height of the elevation, a convex arch. At least parts of the elevations however can also be formed by planar surfaces, which preferably taper off towards the adjacent weak points.

In a membrane with a circular cross section and with annular areas arranged concentrically to one another and bordered by weak points which form circles, the annular areas or at least some of them can be divided by weak points which run transversely to the circles. These weak points preferably extend radially relative to the circle cross section.

The present invention makes it advantageously possible to produce the membrane from a gas-tight monolayer plastic, for example from a polyamide, a polyamide blend, polyethylene terephthalate, polyethylene naphthalate or polyvinylidene chloride.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
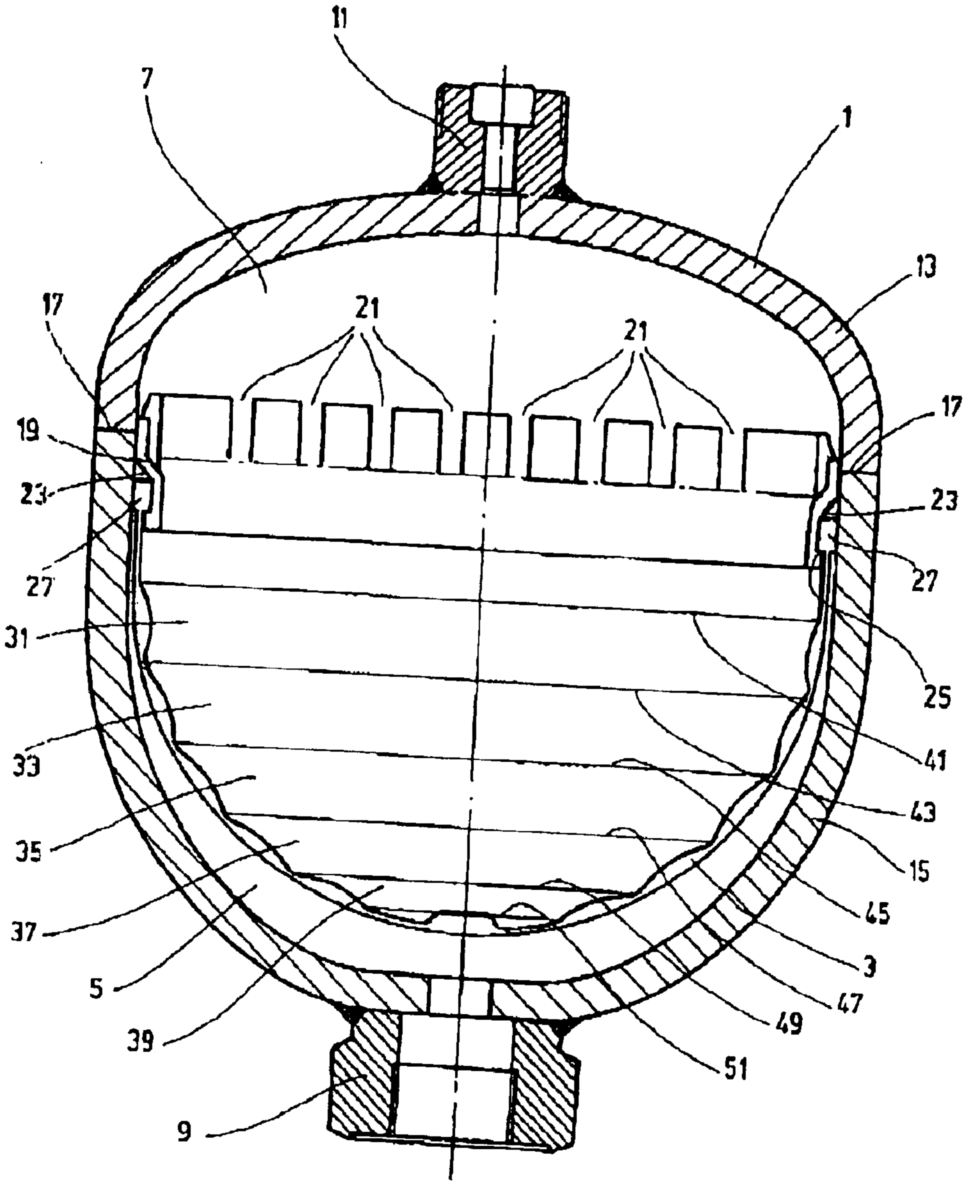
FIG. 1 is a side elevational view in section or an accumulator according to a first embodiment of the present invention.

The accumulator shown in FIG. 1 is a so-called membrane accumulator with a separating element located in the housing 1 and being in the form of a membrane 3. The membrane 3 separates the interior of the housing 1 into a first chamber, in this example a liquid chamber 5, and into a second chamber, in this example a gas chamber 7. Both the liquid chamber 5 and the gas chamber 7 each have a connection 9 and 11, respectively, by which the accumulator can be connected to the pipelines of a hydraulic system (not shown) and by way of which the gas pressure can be set, respectively. Comparable accumulators with the previously described features are state of the art. The accumulator is explained below only to the extent which is necessary for description of the present invention.

The housing 1 includes, when viewed in FIG. 1, a top housing shell 13 and a bottom housing shell 15 which abut one another along a seam 17. Along this seam 17, the two shells 13 and 15 can be joined to one another by an electron beam welding process or laser welding to form the housing 1.

Figure 2:
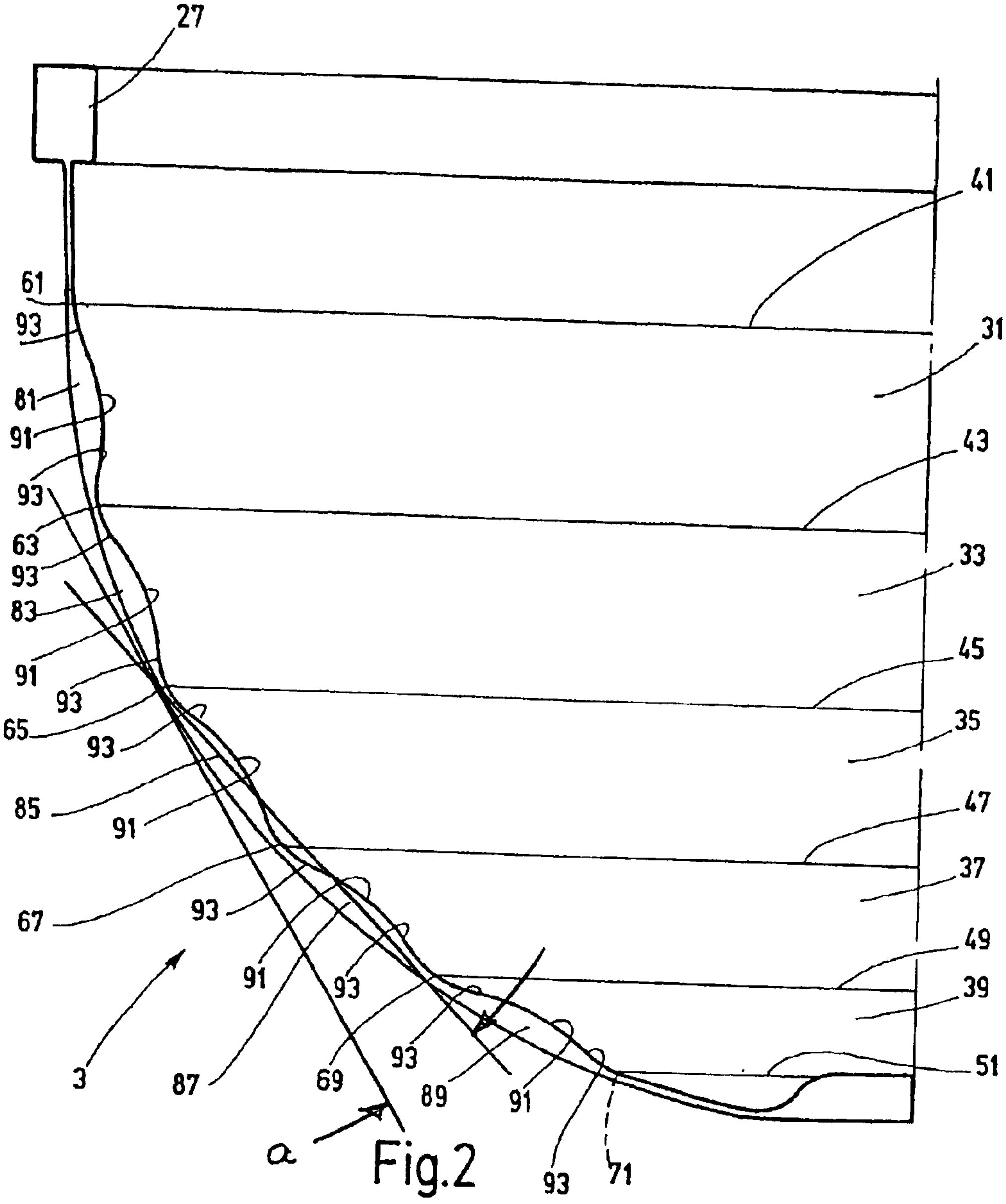
FIG. 2 is an enlarged, highly schematically simplified, partial side elevational view in section of the membrane of the accumulator of FIG. 1, with the membrane in its stretched state.

Within the housing 1, the membrane 3, which is shown in FIGS. 1 and 2 in its stretched state, is held by a steel ring 19. Ring 19 has a height that covers the seam 17 within the housing 1 with an excess length. On its side facing the gas chamber 7, the ring 19 has recesses in the form of notches 21. The notches are rectangular in cross section and are arranged around the ring 19 at the same or equal distances from one another. On its side facing the liquid chamber 5, the ring 19 has a peripheral annular groove 23 with a lower edge, on its side facing the inside wall of the housing viewed in the direction of looking at FIG. 1. Groove 23 forms a shoulder surface 25 as an abutment for the edge bead 27 of the membrane 3. Edge bead 27 has a rectangular cross section. The cross section of the edge bead 27 and the depth of the annular groove 23 are such that the membrane, on the edge bead 27, is held gas-tight on the inside wall of the housing, if the ring 19 is fixed in the accumulator housing. This fixing takes place in the course of the welding process carried out after seating the upper housing shell 13. To weld the housing 1 on the seam 17, the ring 19 being welded tightly to the housing 1.

Figure 3:
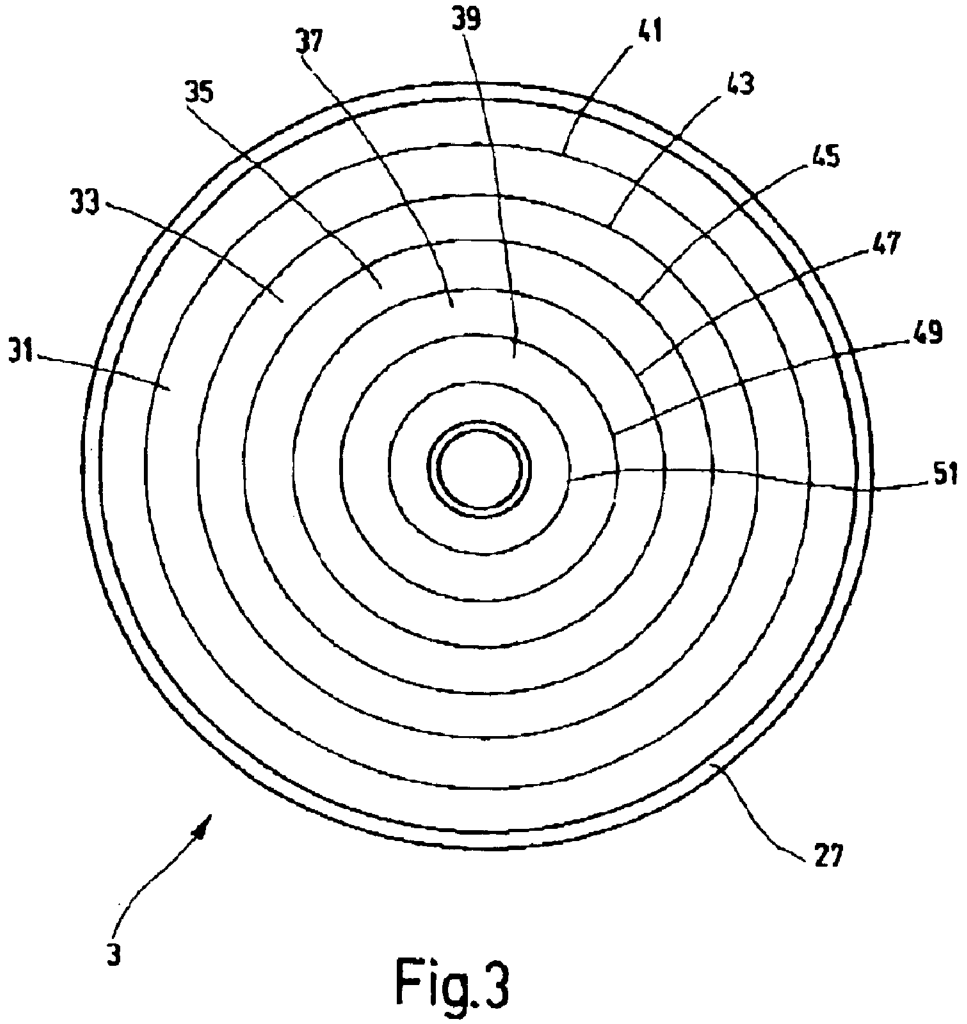
FIG. 3 is a top plan view of the membrane of the first embodiment drawn on the scale corresponding to FIG. 1.

Details of the configuration of the membrane 3 can be taken from FIGS. 1 to 3. FIGS. 1 to 3 show membrane 3 having a round a shape in an overhead view and a somewhat hemispherical shape in a side view. As is best illustrated in FIG. 2, the membrane 3 on its entire outer surface, aside from the end-side edge bead 27, has a smooth surface. On its inside, the membrane has contouring. In the embodiment shown in FIGS. 1 to 3 the contouring divides the membrane 3 on its inside into concentric annular areas 31, 33, 35, 37 and 39. These annular areas each are bordered laterally by weak points 61, 63, 65, 67, 69 and 71 in which the membrane 3 has its smallest wall thickness. These weak points extend along the inside periphery of the membrane along circles 41, 43, 45, 47, 49 and 51. In the annular areas 31, 33, 35, 37 and 39 between the weak points, flat, bead-like elevations 81, 83, 85, 87 and 89, (see FIG. 2) are provided.

As is clear from FIG. 2, each elevation 81, 83, 85, 87 and 89 has its greatest height, corresponding to the greatest wall thickness of the membrane, in the central area between the respective bordering weak points 61, 63, 65, 67, 69 and 71. In this example, each elevations in this central area has a convex arch 91. One concave area 93 which extends up to each bordering weak point laterally adjoins the convex arch 91. The concave areas 93 extend tapering off flatly to the respectively assigned weak points. The flat angle a of incline relative to the tangential plane of the membrane 3 in the stretched state, which plane is tangential relative to the respective weak point, is preferably on the order of 12°to 14°.

Based on this configuration with elevations 81, 83, 85, 87, 89 which rise gently at the weak points 61, 63, 65, 67, 69, 71. The weak points, when folds form in the membrane 3 as a result of the working motion of the membrane 3, form articulations in the manner of film hinges on which folding of the membrane takes place in a controlled manner. As a result of the configuration of the present invention, no sharp kinks are formed. Local overstress of the membrane material is prevented, and high operating service life is achieved.

Figure 4:
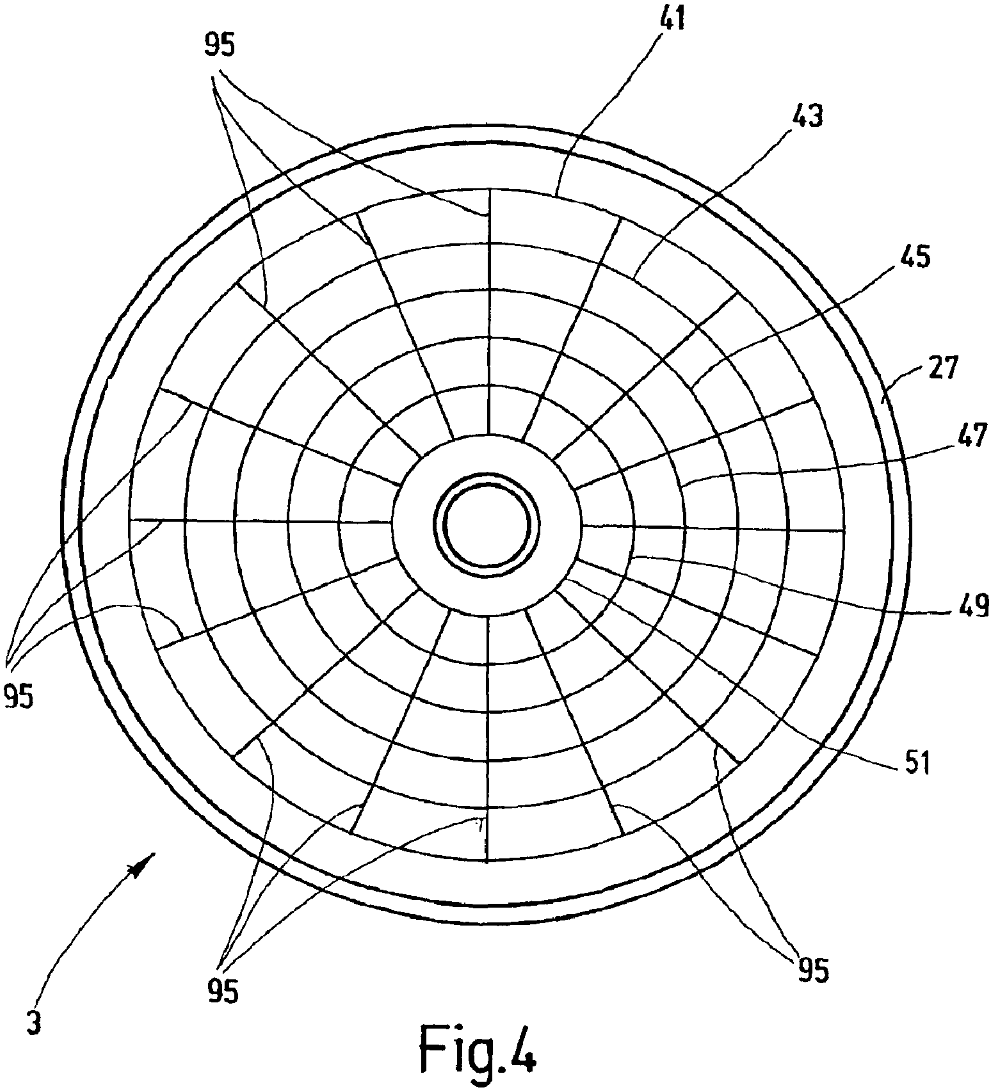
FIG. 4 is a top plan view similar to that of FIG. 3, of a membrane according to a second embodiment of the present invention.

FIG. 4 shows a second embodiment in which the membrane 3, in addition to the weak points extending along the circles 41, 43, 45, 47, 49, 51, is articulated by radially (relative to the circular shape) running weak points 95. These radially running weak points 95 divide the bead-like elevations located within the annular areas and having the greatest height in the central area between the bordering weak points in exactly the same manner as is shown in FIG. 2 for the first embodiment. From these areas of greatest prominence, the elevations taper off in the corresponding manner as in the example from FIG. 2 to the bordering weak points which they approach at a flat angle. Here, a concavely/convexly curved arch can be provided in the corresponding manner, as in FIG. 2. The concave arched areas approach both the weak points along the circles 41, 43, 45, 47, 49, 51 and also the radially running weak points 95.

Instead of the arched shape shown in the figures, there can be other arched shapes or combined shapes composed of arched areas and plane surface areas. However, the approach to the respectively bordering weak points takes place at flat angles. In the embodiments according to FIG. 4, additional weak points which extend transversely or radially to the circles need not be provided in the number as shown in FIG. 4. These transversely extending weak points need not extend beyond all the annular areas, and can extend other than in a star-shape or radially. The film hinges shown in FIGS. 3 and 4 as weak points are shown for the sake of simplicity as concentric circles with the same distance between one another. As is shown in FIG. 2, the distances however are different, especially increasing from the outside to the inside toward the membrane center.

The material for the membrane 3 is preferably gastight monolayer plastics, for example polyamide, such as PA6, a polyarrude blend, for example PA polyolefin, or polyethylene terephthalate or polyethylene naphthalate or polyvinylidene chloride. Other types of materials can be provided for producing the membrane. The radius of curvature for the concave weak points is smaller than the radius of curvature for the convex elevations. In this respect, they are less strongly curved than the adjacent weak points.

While various embodiments have been chosen to illustrate the invention, it will be understood by those skilled in the art that various changes and modifications can be made therein without departing from the scope of the invention as defined in the appended claims.

What is claimed is:

1. A hydropneumatic accumulator, comprising:

an accumulator housing having a wall, a gas chamber and a liquid chamber; and a membrane located in said housing and separating said gas chamber from said liquid chamber, said membrane having multiple annular areas interconnected by annular weak points functioning as articulations, said annular areas having elevations on an inner side of said membrane facing away from said wall of said accumulator housing, said elevations having central areas between the respective weak points with greatest heights thereof increasing wall thicknesses of said membrane thereat and having at least partially convex shapes tapering flatly towards the respective weak points, border areas of said elevations adjacent said weak points tapering at flat angles to tangential planes of said membrane at said weak points in a stretched position of said membrane, said flat angles being less than 20 degrees.

2. A hydropneumatic accumulator according to claim 1 wherein said weak points have concave shapes; and said membrane has an alternating sequence of said convex shapes and said concave shapes.

3. A hydropneumatic accumulator according to claim 1 wherein said membrane has an initial position in which an outer surface thereof has a permanent and essentially uniform curvature.

4. A hydropneumatic accumulator according to claim 3 wherein said outer surface is hemispherical in shape.

5. A hydropneumatic accumulator according to claim 1 wherein said flat angles are not greater than 15 degrees.

6. A hydropneumatic accumulator according to claim 1 wherein said membrane has a circular cross section;

said annular areas are concentric to one another and are bordered by the respective weak points, said weak points forming circles; and at least some of said annular areas are divided by weak points extending radially relative to said circles.

7. A hydropneumatic accumulator according to claim 1 wherein said membrane is formed of a gaslight monomer plastic.

8. A hydropneumatic accumulator according to claim 7 wherein said plastic is a polyamide.

9. A hydropneumatic accumulator according to claim 8 wherein said polyamide is PA6.

10. A hydropneumatic accumulator according to claim 7 wherein said plastic is a polyamide blend.

11. A hydropneumatic accumulator according to claim 10 wherein said polyamide blend is PA polyolefin.

12. A hydropneumatic accumulator according to claim 7 wherein said plastic is polyethylene terephthalate, polyethylene naphthalate or polyvinylidene chloride.

* * * * *

UNITED STATES PATENT AND TRADEMARK OFFICE
CERTIFICATE OF CORRECTION

PATENT NO. : 6,901,965 B2
APPLICATION NO. : 10/468267
DATED : June 7, 2005
INVENTOR(S) : Herbert Baltes and Markus Lehnert It is certified that error appears in the above-identified patent and that said Letters Patent is hereby corrected as shown below:

On sheet 2 of the drawings, Fig. 2 should appear as follows:

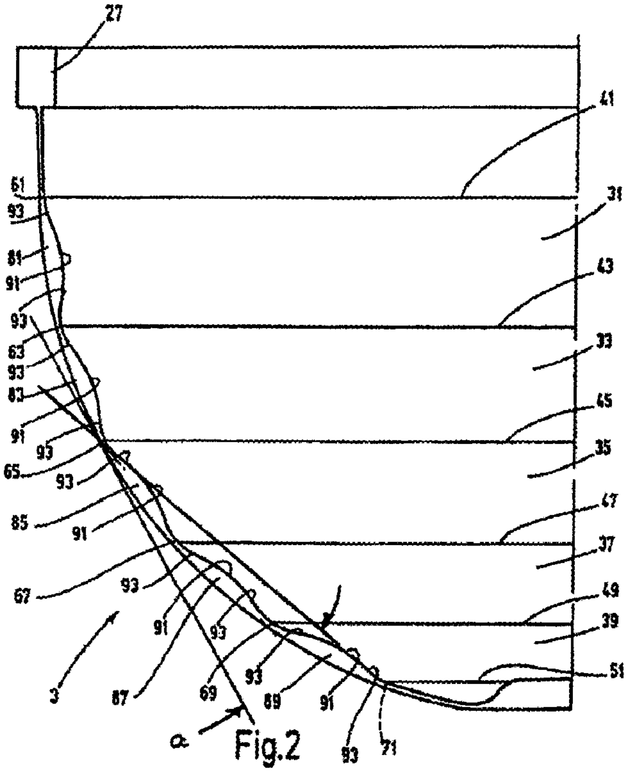

Fig.2

Signed and Sealed this

Sixteenth Day of September, 2008

JON W. DUDAS
*Director of the United States Patent and Trademark Office*